W. L. KELLER.
LAND ROLLER, PACKER, AND PULVERIZER.
APPLICATION FILED OCT. 1, 1912.
1,069,264.
Patented Aug. 5, 1913.
2 SHEETS—SHEET 2.
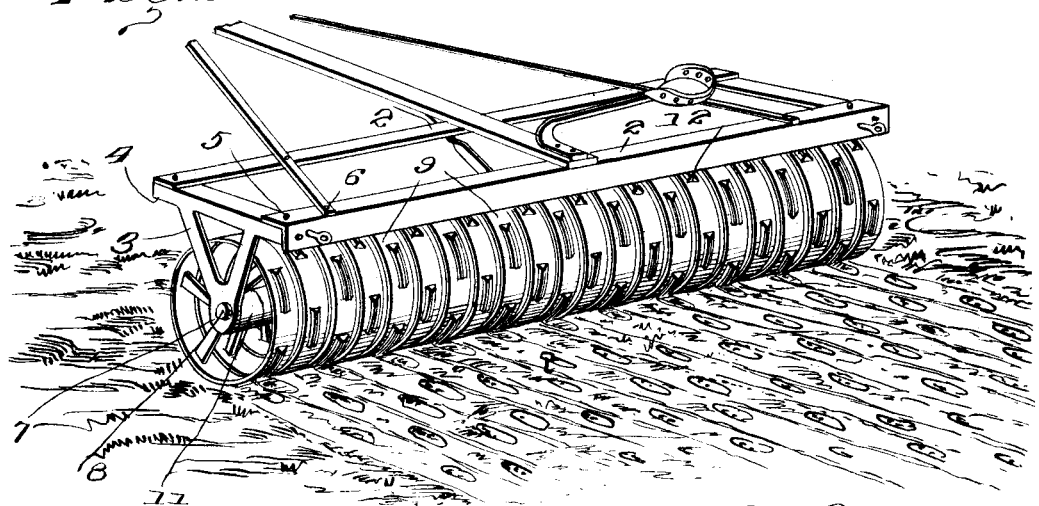
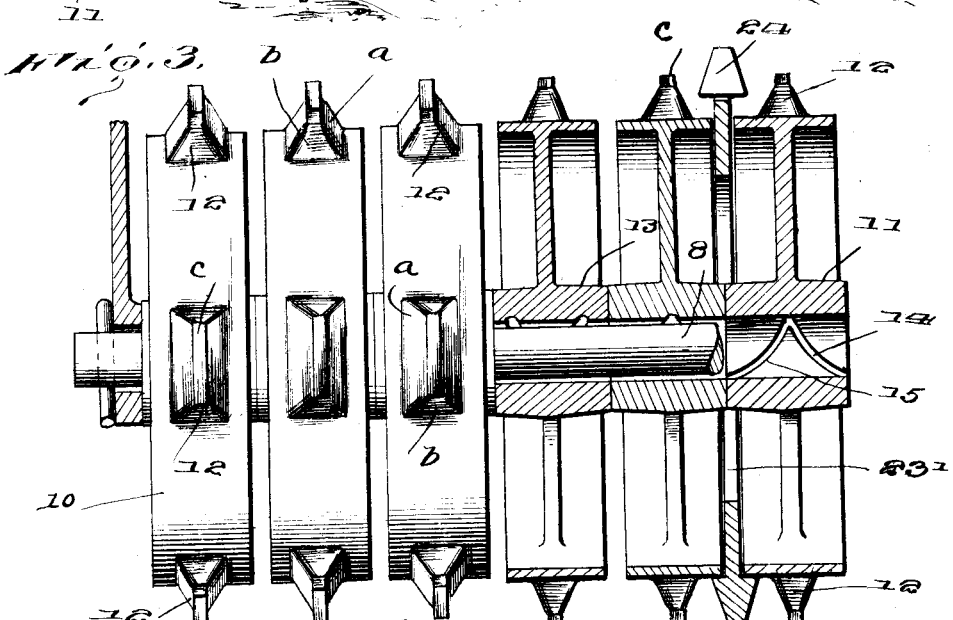
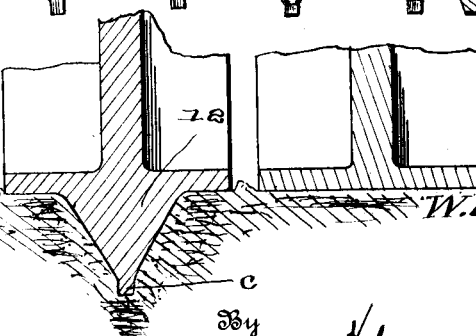
Inventor
W. L. Keller.

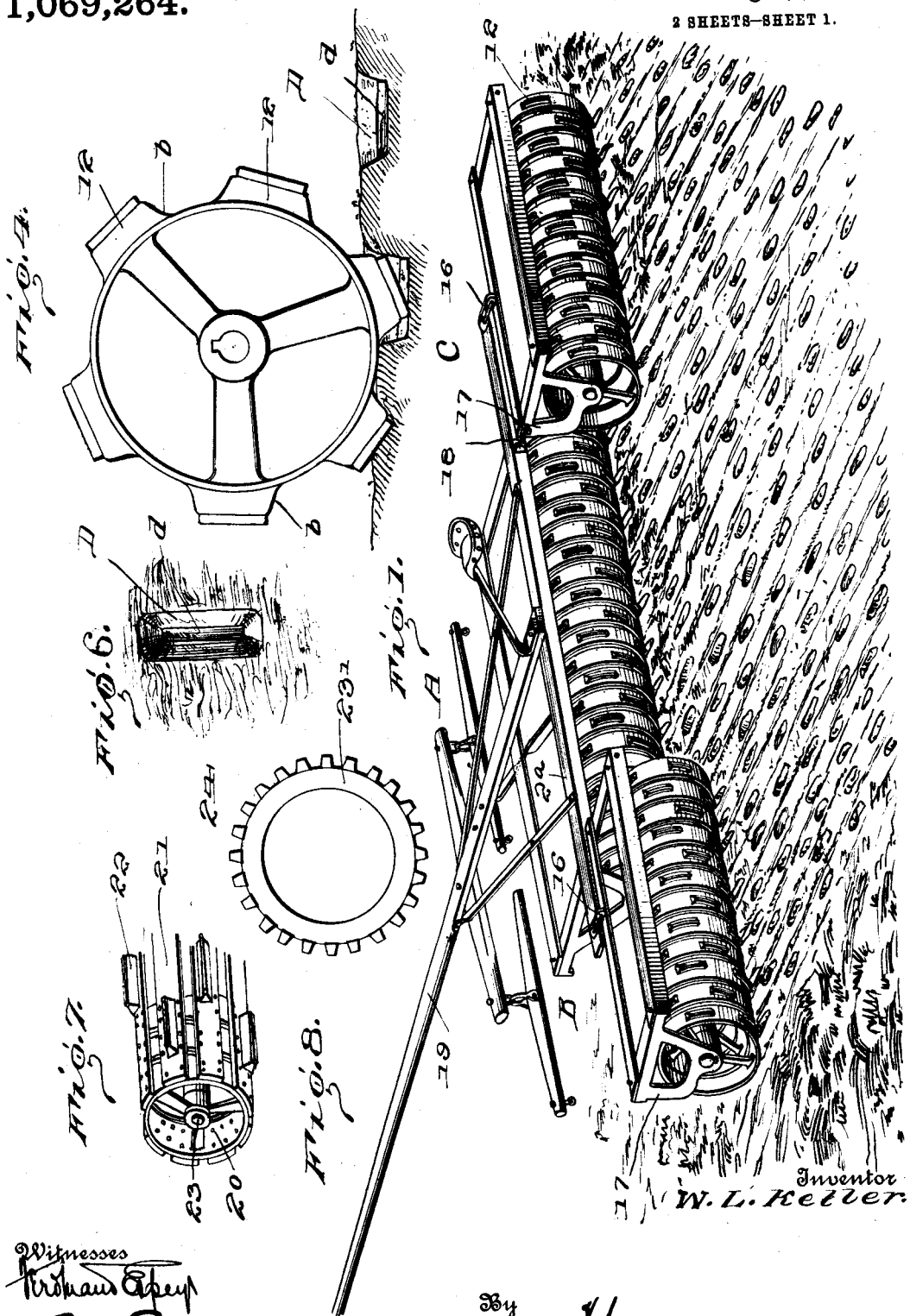

to the side bars by means of bolts 5 and 6. The lower ends of the brackets terminate in bearings 7 for a transverse shaft 8. This shaft is held in place by pins at opposite ends of the shaft or in any other suitable manner and the shaft rotates loosely within the bearings 7. Mounted upon the shaft are a plurality of presser wheels designated 9. There are as many of these presser wheels as may be desired, depending upon the length of the frame formed by the bars 2 and 3. Preferably each of the presser wheels is sixteen inches high with a tread 3⅜″ wide. Each wheel comprises a tread 10, a hub 11 and spokes. Of course, the particular form of the wheel is not important. The hub 11 is wider than the tread 10, and preferably the hub 11 is 4⅛″ wide. When these presser disks or wheels are placed along the shaft with their hubs abutting against each other, a space one-half inch wide is left between the treads of adjacent wheels for a purpose that will be later explained. Formed upon the tread of the wheel are a plurality of lugs 12 shown as six in number on a 16″ wheel, these lugs projecting beyond the surface of the wheel about 1¾″. These lugs are approximately 2½″ wide and 4½″ long at the base. As illustrated in Fig. 3, these lugs have slanting side faces $a$ and end faces $b$ slanting outwardly and toward the middle plane of the wheel and a straight sided portion or rib $c$ forming the apex of the lug and of the same length as the outer portion of the lug. The side faces and end faces $b$ of the lug are not absolutely straight but slightly curved so as to merge more or less gradually into the face of the tread. The object of this peculiar conformation of the lug and its relation to the tread of the wheel will be discussed later.

The shaft 8 upon which the rollers or disks are mounted is preferably smaller than the bore of the hub of each disk and I have found in practice that it is best to form the hub with a bore 2⅛″ in diameter and use a 2″ shaft. The bore of each hub is formed with diverging slots or channels 14 and 15 meeting at the middle plane of the hub and extending outward to the ends of the hub. The purpose of these channels is to provide means whereby each hub will clean itself of the sand or dirt that may sift in between the shaft and the hub and thus do away with the necessity of using oil to lubricate the bearings.

It is to be understood that the slots or grooves 14 and 15 converge in the direction of rotation of the wheel, and it is also to be understood that I need not necessarily use this arrangement on all the wheels but that I may use one on the outside wheels of each gang as it is here that the dust and grit most accumulate.

Inasmuch as the shaft 8 is loose, it may rotate in its bearings and inasmuch as the wheels are loose, they rotate with relation to the shaft. In actual practice I find that the wheels or disks will rotate about ten times to one rotation of the shaft.

Preferably the shaft is supported at its middle as well as at its ends by means of a depending bracket constructed in precisely the same manner as the brackets 3.

While I may use one gang or a plurality of gangs, as before stated, mounted in any suitable manner with relation to each other, I have shown in Fig. 1 a machine in which the several gangs A, B and C are formed practically as previously described, but the rear gangs C and B overlap the adjacent ends of the forward gang A. The rear frame bar 2ª of the forward gang is extended on each side beyond the series of disks or wheels, and the rear gangs are loosely linked, each at its middle as at 16 to this rear frame bar 2ª. The end brackets 17 of the rear gangs are connected at 18 by a loose connection to the frame bar 2ª so that the rear gangs may move freely to conform to the surface of the ground. I have also shown a tongue 19 connected to the forward gang. It will, of course, be understood that I do not wish to limit myself to any specific manner of forming or arranging these parts inasmuch as they do not constitute the main feature of my invention.

It is to be noted that the tread of each wheel or disk is wider than the base of the lugs 12 mounted thereon and that these lugs are spaced from each other. The purpose of this is as follows: The tread face 10 tends to compress the soil so as to force the particles of the surface soil into contiguity with each other and compact it. Each lug, as the wheel moves over the ground, forms a cup, depression or pocket D in the ground and at the bottom of each main depression there is formed a straight sided, longitudinally extending depression $d$. The soil on each side and in front of and behind the pocket will be compressed. The soil at the sides of the main pocket D will also be compressed, by the beveled faces of the lugs. The soil at the bottom of the pocket $d$ will also be compressed but the soil at the sides of the small extension $d$ of the main pocket will not be compressed but will be cut through and therefore loose as illustrated in the sectional view, Fig. 5. As a consequence rain will tend to gather in the cups, depressions or pockets D and the water can easily get through into the ground through the side walls of the portion $d$, the ground not being packed at that point. A continuously corrugated roller would press the ground evenly over its entire extent so that in an ordinarily heavy rain, the soil will start to wash away. With my improved roller, the water will not act to wash away the upper soil but will

UNITED STATES PATENT OFFICE.

WILLIAM L. KELLER, OF KEARNEY, NEBRASKA.

LAND ROLLER, PACKER, AND PULVERIZER.

1,069,264.  Specification of Letters Patent.  Patented Aug. 5, 1913.

Application filed October 1, 1912. Serial No. 723,413.

*To all whom it may concern:*

Be it known that I, WILLIAM L. KELLER, citizen of the United States, residing at Kearney, in the county of Buffalo and State of Nebraska, have invented certain new and useful Improvements in Land Rollers, Packers, and Pulverizers, of which the following is a specification.

My invention relates to land rollers or packers, and particularly to a roller of this character having a plurality of rolling and packing pulverizing disks.

The primary object of my invention is to provide a roller and packer of this general character so constructed that it will press the ground evenly and firmly, thus preventing washing away of the surface of the soil, and further so constructed that a plurality of open cups will be formed in the surface of the soil designed to catch and retain water which may fall thereon.

A further object is to so form the roller that the upper soil around the cup and at the bottom of the cup will be compressed while the soil of the lower side or wall of the cup will be relatively loose so that water can easily pass into the ground an inch or so below the surface and be retained therein from evaporation.

A further object in this connection is to provide a roller which is not only adapted to perform the function above referred to, but which is also adapted for treating the soil for winter wheat, it being used early in the spring to break the crust of the soil and perforate the ground so that it will receive the spring rains and hold the moisture through the dry period which usually follows.

In general it may be said that my improved roller is especially intended to so prepare soil that it will not only receive the rain but retain the moisture within the soil.

A further object of the invention is to provide an agricultural machine of this character comprising a plurality of disks, the disks being loosely mounted upon a transverse shaft in such manner as not to require the application of any lubricating oil to the shaft, and in such manner that dust or dirt which would otherwise be liable to accumulate between the hub of the wheel and the shaft shall be automatically ejected from the hub.

A further object is to provide a machine of this character including a plurality of pressing and pulverizing disks loosely mounted upon a shaft with means whereby the shaft may rotate independently of the loose pulverizing disks themselves, thus doing away with the necessity of using oil as a means of lubricating the wheels, which oil would otherwise be liable to become clogged with dirt and dust and pack the wheel.

Other objects will appear in the course of the following description.

My invention is illustrated in the accompanying drawings wherein:

Figure 1 is a perspective view of my invention applied to a three gang packer and land roller. Fig. 2 is a perspective view of my invention applied to a one gang machine. Fig. 3 is a part section and part elevation of some of the wheels of the improved roller, the bearing of the roller being in section. Fig. 4 is a side elevation of one of the rollers and showing the peculiar form of the lugs thereon. Fig. 5 is an enlarged fragmentary sectional view of the rims of a number of rollers and showing the action of the roller on the soil beneath. Fig. 6 is a plan view of one of the pockets formed in the soil. Fig. 7 is a fragmentary perspective view of a roller constructed in accordance with my invention but having a modified form. Fig. 8 is a side elevation of the mulcher which may be used with my packing wheels.

Corresponding and like parts are referred to in the following description and indicated in all the views of the accompanying drawings by the same reference characters.

In these drawings, I have illustrated my invention as applied to a three gang flexible frame pulverizer and packer but I wish it understood that it is equally applicable to a one gang machine, and in Fig. 2 I have shown a one gang machine of any desired length. In this figure, 2 designates the oppositely disposed, laterally extending front and rear bars of the frame. These bars may be made of any suitable material but preferably are angle irons. Attached to the ends of the bars and depending from the same are the brackets 3. As illustrated, these brackets are angular at their upper ends so as to fit within the ends of the angle bars and have depending end portions 4 which are bolted soak under the surface through the open cups and so gets deep enough into the ground that a hot sun and wind following the rain will not tend to dry it out. It has been proven that where the surface soil is packed, it tends to bring the water to the surface, that is, where there is no loose soil between the subsoil and the packed soil, but with my improved roller the moisture is retained between the surface soil and the subsoil.

If my improved roller be used before seeding and the seed is sown in the holes or pockets formed by the lugs it will be sure to germinate if there is any moisture in the ground and thus feed the plant.

It will be noted that a half inch ridge $d$ is left between the disks. This ridge has the following purpose: It prevents the wind from blowing the soil back and forth and cutting off the young and tender plants.

My improved roller is not only for use in dry weather but is also useful in wet weather as the top ridges do not hold the water and this prevents the water from backing upon the land, thus leaving it mellow. The extreme top of the ridge will be dry sooner than the soil immediately adjacent and thus a farmer can operate on it before he can on land that is not treated with this roller. I have found in practice that crops grown on land treated with this roller are not subject to various diseases. Thus grain is not liable to rust. Rust is caused by water on the upper surface and the heat of the sun burning the land. If the land is treated with this roller, the water will be at least 1½" below the surface and thus will not be evaporated by the heat of the sun.

The improved roller may be used to pulverize earth and cloddy land as the lugs have the shape of a wedge and when they are forced into the ground by the weight of the machine, these lugs press the soil in all directions.

It is to be particularly noted that the disks should be set quite close to each other so that only a one half inch space is left between the tread faces of the disks. With my construction the disks can not be readily oiled and as a consequence I have provided the peculiar mounting for the disks illustrated whereby any dust or dirt which may gather within the hub will be ejected therefrom.

In Fig. 7 I show a modification of my construction in which a roller is formed of end wheels 20, these wheels being connected by transverse cross bars 21. Each of these bars is formed with transversely extending lugs 22 constructed in precisely the same manner as the lugs 12 heretofore described, the only difference being that they extend transversely of the line of draft instead of parallel with the line of draft. The roller so formed is rotatably mounted upon the shaft 23 which is mounted upon a gang frame such as previously described. Of course, in this form of my invention the lugs 22 will always have the same relation to each other while in the other form of the invention, the wheels or rollers being independently rotatable, the depressions formed in the ground will vary with relation to each other. I prefer the form shown in Figs. 1 and 2 to that shown in Fig. 7 for the reason that the form shown in Fig. 7 does not leave any longitudinal ridges between the lines of depressions or pockets.

In Fig. 8 I show a side elevation of a mulching wheel which is necessary to be used in some localities where the soil is very lumpy and the wind does not blow very much. This mulcher as illustrated in this figure and in Fig. 3, consists of a flat rim of relatively thin metal designated 23'. This rim is annular and is adapted to fit loosely between two of the packing wheels. The periphery of the rim is formed at intervals with transversely extending teeth designated 24, each tooth being triangular in shape. These teeth project over the face of the adjacent packing wheel. The inner diameter between the teeth is slightly larger than the exterior diameter of the packing wheel so that the mulching wheel fits loosely therein and rotates freely independent of the packing wheels, that is, the mulching wheel runs on the rims of the larger wheels but is left in place by the projecting teeth so that it can not get out of the space between the packing wheels. The mulching wheel runs slower than the packing wheels and drags a little. In doing this, it first packs the soil and then roughs over the surface a little. The teeth are preferably one inch high, one and one-half inches long transversely and one inch thick at the base.

While I have shown in Fig. 1 a gang consisting of a forward roller and two rearward rollers, the rear rollers overlapping the forward rollers, it will be understood that if the two rear gangs or sections are of the same length as the one middle section, they may be engaged with the middle section right behind it thereby to make a double roller, that is, an eight foot roller instead of a sixteen foot.

What I claim is:

1. A land roller and presser of the character described including a frame, a shaft carried thereby, and a rotatable pressing member mounted upon the shaft, the outer face of the pressing member being formed with a plurality of lugs spaced from each other, each lug being approximately triangular in form, the ends of the lug and the sides being beveled, the middle of the lug being formed with a longitudinally extending projecting rib.

2. A land roller and presser including a gang comprising a frame having depending brackets, a shaft rotatably mounted in the brackets, a plurality of pressing wheels mounted upon said shaft, each pressing wheel having a rim and a hub, the hub projecting laterally beyond the rim, the hubs of the several wheels contacting with each other whereby to space the rims from each other, each pressing wheel being formed with a plurality of outwardly projecting lugs approximately triangular in cross section and less in width at the base than the width of the rim, the sides of the lugs being outwardly beveled toward the rim, the middle of each lug being formed with a longitudinally extending rib.

3. A land roller and presser including a frame, a shaft and a presser wheel mounted thereon, the wheel having a flat faced portion, and a plurality of pocket forming lugs projecting from the flat faced portion, each lug being approximately triangular in section and having beveled sides and ends, each lug being formed at its apex with a longitudinally extending rib having straight sides, and each lug being less in width than the flat faced portion from which it projects.

4. A land roller and presser including a frame, a shaft and a plurality of presser wheels mounted thereon and spaced from each other, each wheel including a rim and pocket forming lugs disposed upon the rim and less in width than the rim, and a plurality of mulching wheels disposed one between each pair of pressing wheels and comprising a disk having a plurality of transversely extending teeth formed upon its periphery and extending over and bearing upon and supported by the margins of the adjacent pressing wheels.

5. A land rolling presser including a frame, a rotatable shaft, a plurality of presser wheels mounted on the shaft and spaced from each other, each wheel being rotatable independently of the shaft and of adjacent wheels, each wheel including a rim and pocket-forming lugs disposed upon the rim and less in width than the rim, and a plurality of mulching wheels disposed each between a pair of presser wheels and including a rim having peripheral transversely extending teeth, said mulching wheels being rotatable independently of the shaft and of the presser wheels and being supported upon and having bearing on said pressing wheels.

6. A land rolling presser of the class described, including a frame, a shaft carried thereon and a plurality of presser wheels mounted upon the shaft and spaced from each other, each wheel including a flat faced rim, the outer face of the rim of each wheel being formed with a plurality of pocket-forming lugs extending at spaced intervals around the rim, each lug being approximately triangular in form, the ends of each lug and the sides being beveled, the middle of the lug being formed with a longitudinally extending projecting rib having side faces at right angles to the shaft.

7. A land rolling presser of the class described, including a frame, a shaft carried thereby, and a plurality of rotatable presser wheels mounted upon the shaft, the hub of each wheel projecting on each side beyond the rim thereof whereby to space the rims of the wheels from each other, the rim of each presser wheel being flat faced and provided with a peripherally extending series of pocket-forming lugs, each lug being approximately triangular in form, a certain portion of each lug being beveled and a certain portion of each lug having faces extending parallel to a line drawn through the axis of the hub and middle of the lug.

8. A land rolling presser including a shaft, a plurality of presser wheels carried thereon and spaced from each other, each wheel including a flat rim and a series of pocket-forming lugs disposed upon the rim and less in width than the rim, and a mulching wheel disposed between two adjacent presser wheels and comprising a disk having a central opening larger than the shaft and formed upon its edge with a plurality of transversely extending triangular teeth, said teeth extending on each side beyond the disk and bearing upon and having slidable engagement with the lateral margins of the adjacent presser wheels, the mulching wheel being independently rotatable with relation to the presser wheels.

In testimony whereof I affix my signature in presence of two witnesses.

WILLIAM L. KELLER. [L. S.]

Witnesses:
JAS. A. CLEARY,
C. E. OEHLER.

Copies of this patent may be obtained for five cents each, by addressing the "Commissioner of Patents, Washington, D. C."